United States Patent
Tainsh et al.

(10) Patent No.: US 10,114,799 B2
(45) Date of Patent: Oct. 30, 2018

(54) METHOD FOR ARRANGING IMAGES IN ELECTRONIC DOCUMENTS ON SMALL DEVICES

(71) Applicant: CANON KABUSHIKI KAISHA, Tokyo (JP)

(72) Inventors: Mark Ronald Tainsh, Pymble (AU); Ivan Matic, Crows Nest (AU)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 14/011,097

(22) Filed: Aug. 27, 2013

(65) Prior Publication Data
US 2013/0346853 A1    Dec. 26, 2013

Related U.S. Application Data

(63) Continuation of application No. 12/973,365, filed on Dec. 20, 2010, now Pat. No. 8,547,400.

(30) Foreign Application Priority Data

Dec. 23, 2009    (AU) ................................ 2009251137

(51) Int. Cl.
*G06F 17/21*    (2006.01)
*G06T 11/60*    (2006.01)
*G06F 3/0481*    (2013.01)

(52) U.S. Cl.
CPC ............ *G06F 17/212* (2013.01); *G06T 11/60* (2013.01)

(58) Field of Classification Search
CPC ..... G06T 17/00; G06T 2210/00; G06T 11/60; G06F 17/212

(Continued)

(56) References Cited

U.S. PATENT DOCUMENTS 5,283,560 A  *  2/1994  Bartlett ................. G06F 3/0481
                                                                 345/902
5,475,812 A  *  12/1995  Corona ..................... G09G 5/14
                                                                 345/629

(Continued)

FOREIGN PATENT DOCUMENTS

AU    2009251133 A1 *  7/2011
JP    2000-163193 A    6/2000

OTHER PUBLICATIONS

"Semi-transparent thumbnail images in front of the selected image," Dec. 1, 2009, http://www.paulvanroekel.nl/picasa/CoolFullScreendemo/index.html.

(Continued)

*Primary Examiner* — Chante Harrison
(74) *Attorney, Agent, or Firm* — Fitzpatrick, Cella, Harper & Scinto

(57) ABSTRACT

Methods (800), apparatuses (100), and computer readable storage mediums of arranging a digital image in one of several image receiving placeholders of an electronic photo album document are provided. The document is displayed (802) on a first virtual plane of a display on a display device. Digital images are displayed (804) on display; the digital images are arranged on a second virtual plane separate from first virtual plane. At least one of the digital images and document are partly transparent enabling the digital images and document to be contemporaneously visible. The second virtual plane extends beyond the boundary of display and can be panned on display device independently of document. A digital image is selected (806) from the displayed digital images; upon selection, the non-selected digital images are at least partly hidden so that the visibility of document on display device is increased. The selected digital image is arranged (808) in an image receiving placeholder.

28 Claims, 9 Drawing Sheets

(58) Field of Classification Search
USPC .............. 345/629, 418, 619, 672, 676, 680; 715/243, 781, 788, 790, 797, 864, 246, 715/700, 764–765, 767, 866, 799; 745/243, 246, 700, 765, 764, 767, 781, 745/788, 866, 864
See application file for complete search history.

(56) References Cited

U.S. PATENT DOCUMENTS

| | | | |
|---|---|---|---|
| 5,651,107 A * | 7/1997 | Frank | G06F 3/0481 345/589 |
| 6,118,427 A * | 9/2000 | Buxton | G06F 3/0481 345/629 |
| 6,453,078 B2 | 9/2002 | Bubie et al. | |
| 7,152,210 B1 | 12/2006 | Van Den Hoven et al. | |
| 7,206,017 B1 | 4/2007 | Suzuki | |
| 7,365,741 B2 | 4/2008 | Chincholle et al. | |
| 2002/0097250 A1 | 7/2002 | Fukushima et al. | |
| 2006/0109517 A1 | 5/2006 | Catalan | |
| 2007/0033220 A1 | 2/2007 | Drucker et al. | |
| 2008/0209311 A1 | 8/2008 | Agronik et al. | |
| 2009/0027418 A1* | 1/2009 | Maru | G06F 17/30241 345/629 |
| 2009/0122079 A1* | 5/2009 | Nishioka | G06F 3/0481 345/619 |
| 2010/0017732 A1* | 1/2010 | Matsushima | G06F 3/0482 715/765 |
| 2010/0037128 A1* | 2/2010 | Reid | G06F 17/30265 715/243 |
| 2010/0066751 A1* | 3/2010 | Ryu | G06F 1/1626 345/581 |
| 2010/0125874 A1* | 5/2010 | Ahn | H04N 5/445 725/41 |
| 2010/0174993 A1* | 7/2010 | Pennington | G06F 1/1616 715/810 |
| 2010/0192066 A1* | 7/2010 | Wu | G06F 17/30775 715/781 |
| 2011/0210980 A1 | 9/2011 | Elgar et al. | |
| 2011/0285748 A1* | 11/2011 | Slatter | G06T 11/60 345/629 |
| 2014/0118395 A1* | 5/2014 | Jirman | G06T 11/00 345/629 |

OTHER PUBLICATIONS

Australian Office Action dated Mar. 15, 2012 in counterpart Australian Application No. 2009251137.

Australian Office Action dated Dec. 7, 2012, in counterpart Australian Application No. 2009251137.

* cited by examiner

METHOD FOR ARRANGING IMAGES IN ELECTRONIC DOCUMENTS ON SMALL DEVICES

This is a continuation of U.S. patent application No. 12/973,365, filed Dec. 20, 2010, allowed.

REFERENCE TO RELATED PATENT APPLICATION

This application claims the benefit under 35 U.S.C. § 119 of the filing date of Australian Patent Application No. 2009251137, filed 23 Dec. 2009 in the name of Canon Kabushiki Kaisha, hereby incorporated by reference in its entirety as if fully set forth herein.

TECHNICAL FIELD

The present invention relates generally to the field of selection and arrangement of images in an electronic document. In particular, but not exclusively, the present disclosure relates to image selection and arrangement in electronic documents, e.g., photo albums.

BACKGROUND

With the widespread use of digital cameras, people commonly accumulate many hundreds or thousands of photographs. With increased capacity of media cards used in digital cameras and the options available to store photographs on media external to the camera such as portable hard drives, CDs, DVDs, or web servers, the storage of such a relatively large collection of photographs is no longer an issue. The selection of only a few photographs from the collection, however, can be a time consuming process which takes longer as the collection gets larger.

The above issue is of particular concern on devices utilizing small screens, such as cameras and mobile phones. In one such small device environment, users are able to arrange the photographs in their collection into an electronic photo album, which is then produced into a physical equivalent. Typically, given the limitation of the number of pages in such photo albums and/or the expense associated with producing the photographs, the user selects only some of the photographs in his or her collection of photographs and arranges these selected photographs on the pages. However, as indicated above, if the user has a large collection of photographs, an unacceptable amount of time for the small device user can be required to select and arrange these images.

There are many issues with automatically selecting and arranging the images onto the image placeholders in the photo album, most of these issues involve the lack of user involvement, which leads to poor choice of images. Another conventional method is a manual approach. In this method, a representation of the image—or preferably the full image itself, is displayed on the screen. The conventional attempt to solve this difficult problem is by displaying low resolution representations (thumbnails) in separate areas of the screen (to the photo album). These areas are commonly known as "panels", and the panels with images inside are "image panels". Currently, this is the most effective approach to allow a user to place the desired images into the image placeholders of an electronic document. However, this method suffers from readability and useability issues when applied to mobile devices, due largely to the size of the screen in such devices.

While a large screen can more easily display many photos from which to choose from, enabling easier and faster photo selection, mobile devices such as cameras and mobile phones typically have a small screen size, and therefore selecting a photo from the photo collection can be time consuming and difficult.

SUMMARY

In accordance with an aspect of the invention, there is provided a method of arranging an image in an electronic document using a display. The electronic document is displayed on the display. Images are displayed on the display. The images are arranged on a virtual plane extending, in at least one dimension, beyond the boundary of the display. At least one of the images on the display and the electronic document are transparent so that both the images and electronic document are visible. The virtual plane is able to be panned on the display independently of the electronic document. An image is selected from the plurality of displayed images, upon selection, the non-selected images being at least partly hidden so that the obfuscation of the electronic document is reduced. The selected image is arranged in the electronic document.

The image may be arranged in the electronic document by placing the selected image into an image placeholder. The method may further comprise highlighting the image placeholder when the selected image is moved over the image placeholder.

The images arranged on the virtual plane may be grouped together on the virtual plane by a characteristic of the images. The characteristic of the images may be the date each candidate image was created, or a geographical characteristic of each image.

The images arranged on the virtual plane may be grouped together on the virtual plane by a characteristic of the electronic document. The characteristic of the electronic document may be the size of the document, or the theme of the document.

Panning the virtual plane to locate an image in the plurality of images over an available placeholder in the electronic document may arrange the image in the placeholder until the virtual plane is further panned, removing the image from the placeholder.

The relative obfuscation of the images in the virtual plane and the electronic document may change when panning of the virtual plane is initiated. The relative obfuscation may also depend on the speed of panning.

In accordance with another aspect of the invention, there is provided an apparatus for arranging an image in an electronic document using a display. The apparatus comprises: a memory for storing data and a computer program; and a processor unit coupled to the memory for executing a computer program, the memory and the processor configured to arrange the image in the electronic document using the display. The computer program comprises: a computer program code module for displaying the electronic document on the display; a computer program code module for displaying a plurality of images on the display, the images being arranged on a virtual plane extending, in at least one dimension, beyond the boundary of the display. The images visible in the display are composited with the electronic document, so that both the images and electronic document are at least partly obfuscated. The virtual plane is able to be panned on the display independently of the electronic document; a computer program code module for selecting an image from the plurality of displayed images, upon selection, the non-selected images being at least partly hidden so that the obfuscation of the electronic document is reduced; and a computer program code module for arranging the selected image in the electronic document.

In accordance with still another aspect of the invention, there is provided a computer readable storage medium having recorded therein a computer program for arranging an image in an electronic document using a display. The computer program comprises: a computer program code module for displaying the electronic document on the display; a computer program code module for displaying a plurality of images on the display, the images being arranged on a virtual plane extending, in at least one dimension, beyond the boundary of the display. At least one of the images on the display and the electronic document are transparent, so that both the images and electronic document are at visible on the display device. The virtual plane is able to be panned on the display independently of the electronic document; a computer program code module for selecting an image from the plurality of displayed images, upon selection, the non-selected images being at least partly hidden so that the obfuscation of the electronic document is reduced; and a computer program code module for arranging the selected image in the electronic document.

In accordance with another aspect of the invention, there is provided a method of arranging a digital image in one of a plurality of image receiving placeholders of an electronic photo album document. The electronic photo album document is displayed on a first virtual plane of a display on a display device. Digital images are displayed on the display. The digital images are arranged on a second virtual plane separate from the first virtual plane of the electronic photo album document such that at least one of the digital images and the electronic photo album document is partly transparent, enabling both the digital images and the electronic photo album document to be contemporaneously visible on the display device. The second virtual plane extends, in at least one dimension, beyond the boundary of the display and is able to be panned on the display device independently of the electronic photo album document. A digital image is selected from the displayed digital images; upon selection, the non-selected digital images are at least partly hidden, so that the visibility of the electronic photo album document on the display device is increased. The selected digital image is arranged in one of the image receiving placeholders of the electronic photo album document.

The method may further comprise restoring the non-selected digital images onto the display from at least partly hidden state of the non-selected digital images.

The image may be arranged in the electronic photo album document by placing the selected image into an image placeholder. The method may further comprise highlighting the image placeholder when the selected image is moved over the image placeholder.

The images arranged on the virtual plane may be grouped together on the virtual plane by a characteristic of the images. The characteristic of the images may be the date each candidate image was created, or a geographical characteristic of each image.

The images arranged on the virtual plane may be grouped together on the virtual plane by a characteristic of the electronic photo album document. The characteristic of the electronic photo album document may be the size of the document, or the theme of the document.

The virtual plane may be panned to locate an image in the images over an available placeholder in the electronic document arranges the image in the placeholder until the virtual plane is further panned, removing the image from the placeholder.

The electronic photo album document may be further obfuscated as the virtual plane is panned.

In accordance with a further aspect of the invention, there is provided an apparatus for arranging a digital image in one of a plurality of image receiving placeholders of an electronic photo album document. The apparatus comprises: a memory for storing data and a computer program; and a processor unit coupled to the memory for executing a computer program. The memory and the processor are configured to arrange the image in the electronic document using the display. The computer program comprises: a computer program code module for displaying the electronic photo album document on a first virtual plane of a display on a display device; a computer program code module for displaying a plurality of digital images on the display, the plurality of digital images being arranged on a second virtual plane separate from the first virtual plane of the electronic photo album document such that at least one of the plurality of digital images and the electronic photo album document are partly transparent enabling both the plurality of digital images and the electronic photo album document to be contemporaneously visible on the display device, the second virtual plane extending, in at least one dimension, beyond the boundary of the display and being able to be panned on the display device independently of the electronic photo album document; a computer program code module for selecting a digital image from the plurality of displayed digital images, upon selection, the non-selected digital images being at least partly hidden so that the visibility of the electronic photo album document on the display device is increased; and a computer program code module for arranging the selected digital image in one of the plurality of image receiving placeholders of the electronic photo album document.

In accordance with a still further aspect of the invention, there is provided a computer readable storage medium having recorded therein a computer program for arranging a digital image in one of a plurality of image receiving placeholders of an electronic photo album document. The computer program comprises: a computer program code module for displaying the electronic photo album document on a first virtual plane of a display on a display device; a computer program code module for displaying a plurality of digital images on the display, the plurality of digital images being arranged on a second virtual plane separate from the first virtual plane of the electronic photo album document such that at least one of the plurality of digital images and the electronic photo album document are partly transparent enabling both the plurality of digital images and the electronic photo album document to be contemporaneously visible on the display device, the second virtual plane extending, in at least one dimension, beyond the boundary of the display and being able to be panned on the display device independently of the electronic photo album document; a computer program code module for selecting a digital image from the plurality of displayed digital images, upon selection, the non-selected digital images being at least partly hidden so that the visibility of the electronic photo album document on the display device is increased; and a computer program code module for arranging the selected digital image in one of the plurality of image receiving placeholders of the electronic photo album document.

BRIEF DESCRIPTION OF THE DRAWINGS

Embodiments of the invention are described hereinafter with reference to the drawings, in which.

DETAILED DESCRIPTION

Figure 1A:
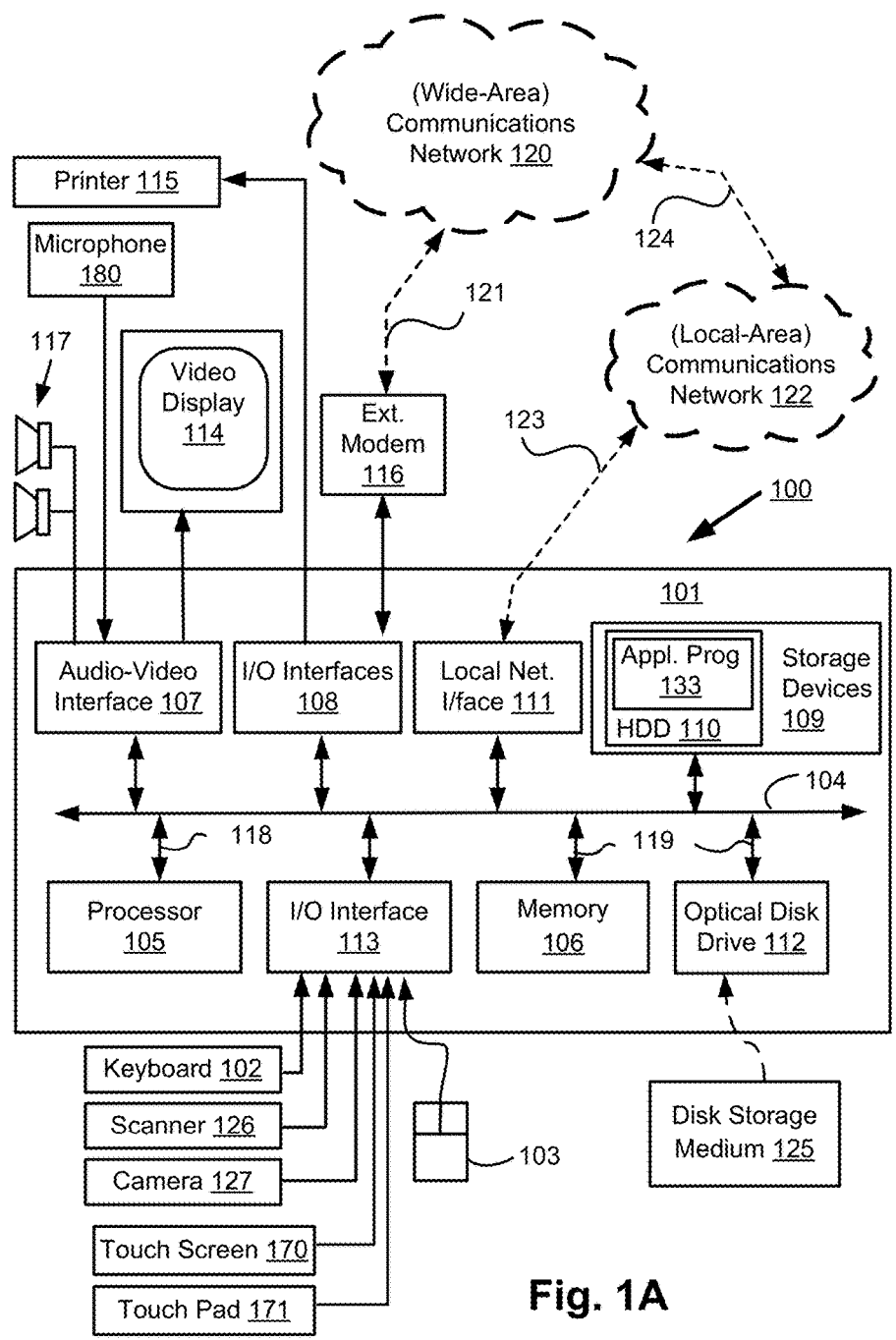
FIGS. 1A and 1B are schematic block diagrams of a general-purpose computer on which the embodiments of the invention may be practiced.
Figure 1B:
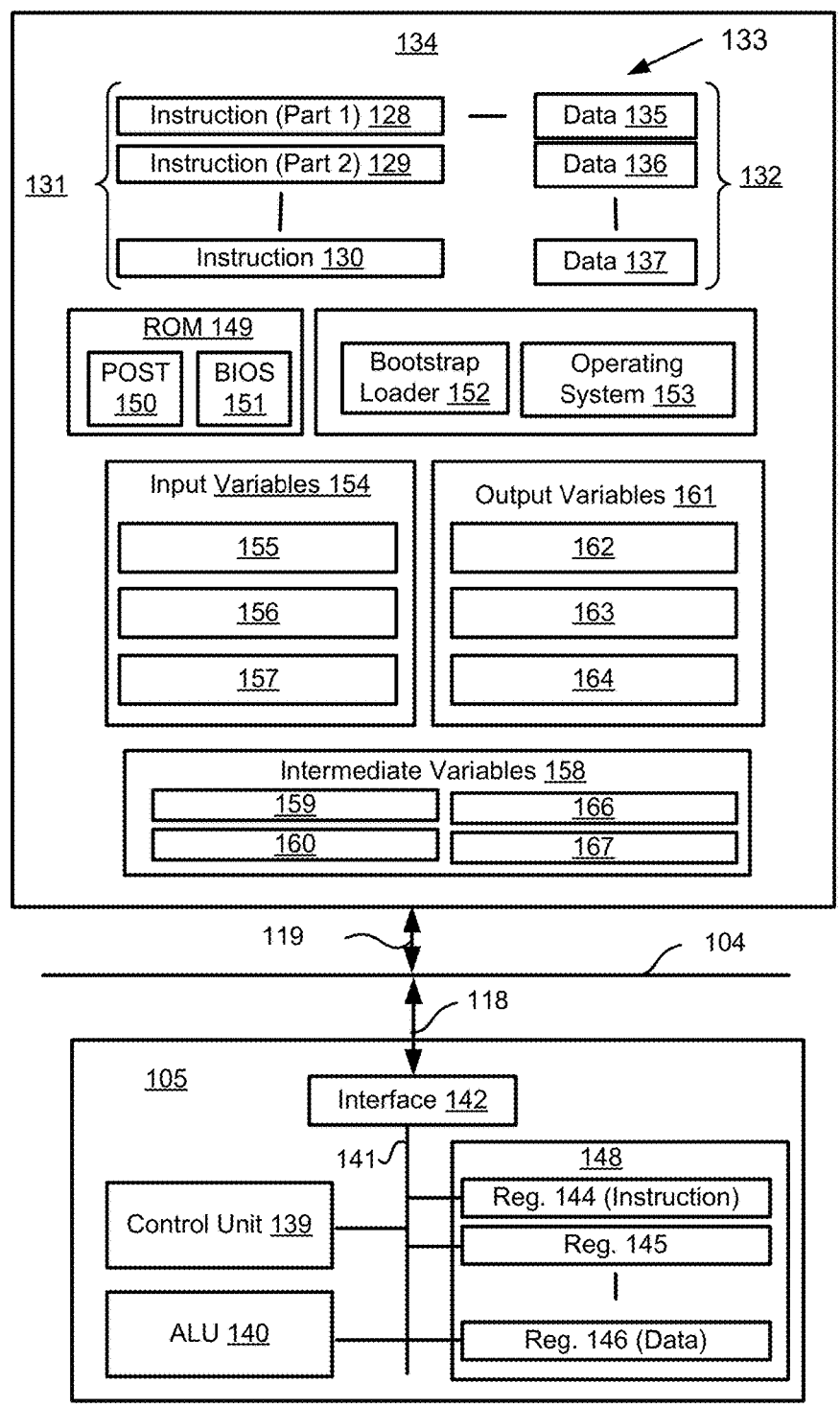

Methods, apparatuses, and computer readable storage mediums for arranging an image in an electronic document using a display are disclosed. More particularly, methods, apparatuses, and computer readable storage mediums for arranging a digital image in one of a plurality of image receiving placeholders of an electronic photo album document are disclosed. In the following description, numerous specific details, including particular image sizes, computer system configurations, small electronic devices, types of electronic documents, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.
Computer Implementation FIGS. 1A and 1B depict a general-purpose computer system 100, upon which the various arrangements described can be practiced. As described herein, the computer system 100 is located in the small device environment 204, such as a camera or a mobile phone. It should be appreciated, however, that the computer system 100 can be located on any suitable device environments, even large screen environments.

As seen in FIG. 1A, the computer system 100 includes: a computer module 101; input devices such as a keyboard 102, a mouse pointer device 103, a scanner 126, a camera 127, touchscreen 170, touchpad 171, and a microphone 180; and output devices including a printer 115 for producing printed output 604, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 can be a physical unit which is the case with a PC tower. In other cases, which include mobile phones, devices including a camera 127, a microphone 180, a video display 114, a touchscreen 170 are all contained in the same physical container as the computer module 101. The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127, touchscreen 170, touchpad 171, and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet™ circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practiced include IBM-PC's and compatibles, Sun Sparcstations, Apple Mac™ or like computer systems.

Figure 7:
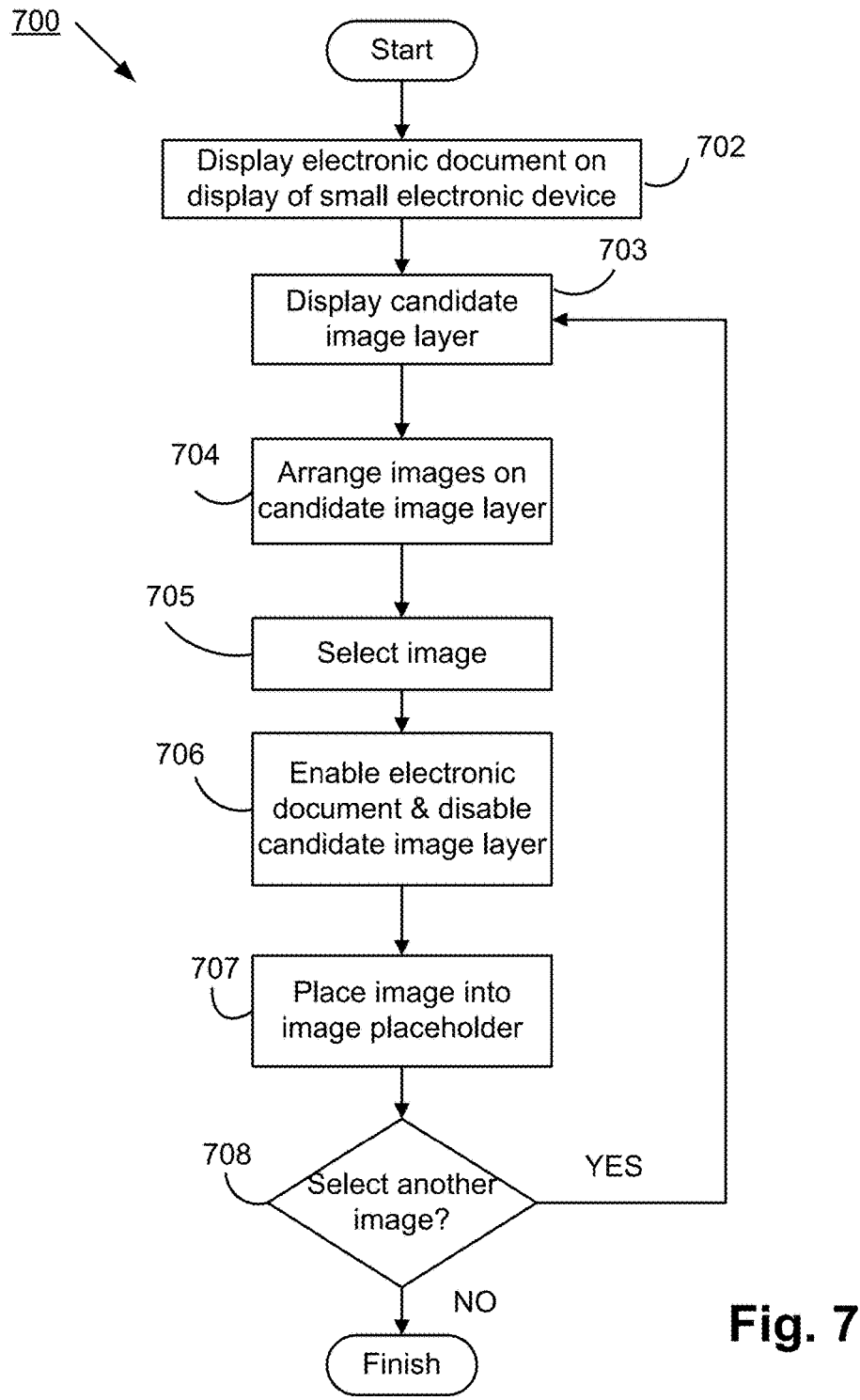
FIG. 7 is a schematic flow diagram illustrating a method of arranging an image in an electronic document using a display, as used in FIGS. 2, 3, 4, and 5.

The method of arranging an image in an electronic document using a display may be implemented using the computer system 100 wherein the process of FIG. 7 may be implemented as one or more software application programs 133 executable within the computer system 100. In particular, the steps of the method of arranging an image in an electronic document using a display are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the image arranging methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for arranging an image in an electronic document using a display.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for arranging an image in an electronic document using a display.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any storage medium that provides recorded instructions and/or data to the computer system 100 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

Figure 6:
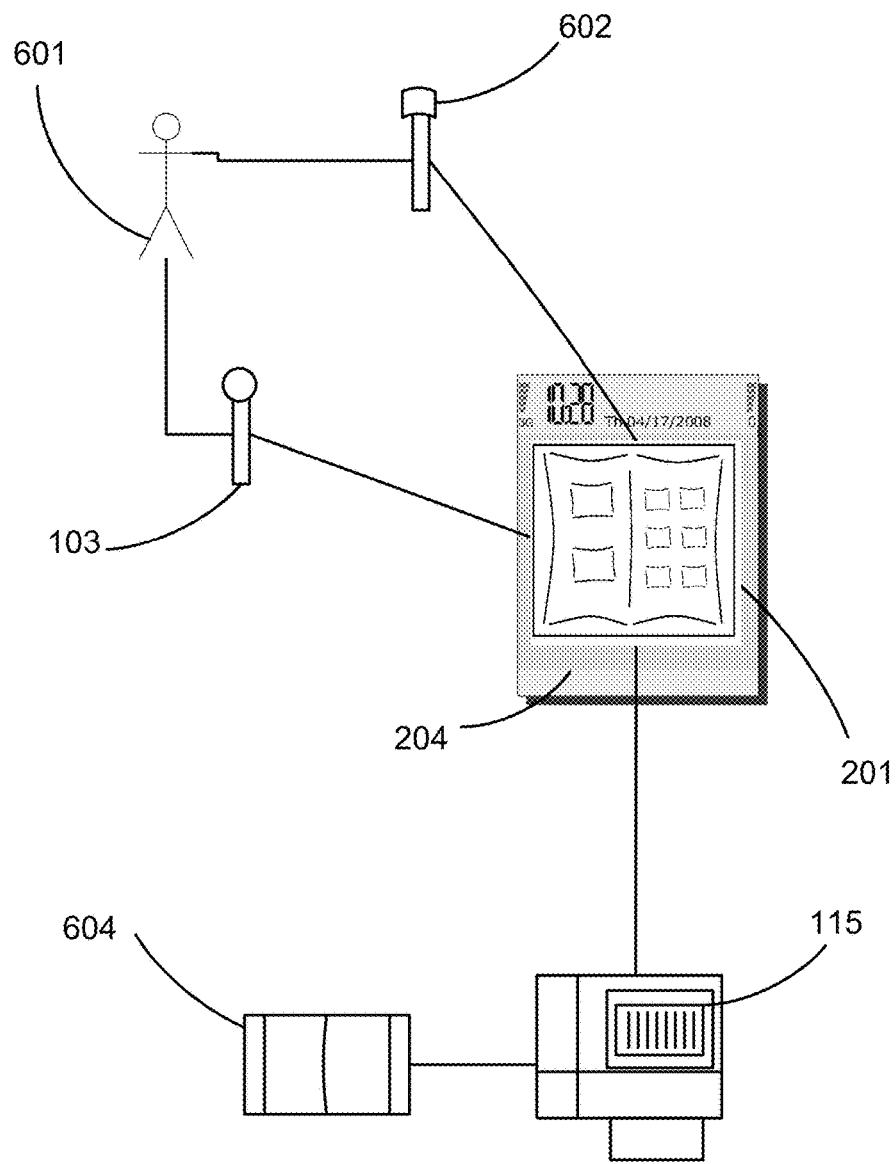
FIG. 6 is a schematic flow diagram illustrating the context of image selection as used in FIGS. 2, 3, 4 and 5.

The second part of the application programs 133 and the corresponding code modules mentioned above may be executed to implement one or more graphical user interfaces (GUIs) to be rendered or otherwise represented upon the display 114. The display 114 is preferably comprised of a touchscreen 201 as seen in FIG. 6, where the mouse 103 or a finger 602 may be used to manipulate the interface to provide controlling commands and/or input to the software applications 133 associated with the GUI(s). In this instance, the computer system 100 may not require the keyboard 102 or the mouse 103. Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed image arranging arrangements use input variables 154, which are stored in the memory 134 in corresponding memory locations 155, 156, 157. The image arranging arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the process of FIG. 7 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The method of arranging an image in an electronic document using a display may alternatively be implemented in dedicated hardware such as one or more integrated circuits performing the functions or sub functions of arranging an image in an electronic document using a display. Such dedicated hardware may include graphic processors, digital signal processors, or one or more microprocessors and associated memories.

Arranging Image in Electronic Document

FIG. 7 illustrates a method 700 of arranging an image in an electronic document using a display. The method 700 can be implemented using the computer system 100 of FIG. 1, for example. Processing commences in document-displaying step 702. In the document-displaying step 702, an electronic document (e.g., a photo album or photo book) is displayed on a virtual plane on the display 114 of a small electronic device. In candidate-image-layer-displaying step 703, a candidate image layer is displayed using the display 114, in which images can be displayed on the display. Steps 702 and 703 are implemented using the processor 105. The candidate image layer is a second virtual plane overlaid on the electronic document, which can be stored in memory 106. In image-arranging step 704, the images are arranged by the processor 105 on the candidate image layer. At least some images are displayed with the electronic album where the images and/or the electronic album are transparent so that both the images and the electronic document. The images arranged on the virtual plane may be grouped together on the virtual plane by a characteristic of the images, such as the date each image was created, or a geographical characteristic of each image, or by a characteristic of the electronic document, the size of the document, or the theme of the document.

In image-selecting step 705, an image is selected using the processor through appropriate input from a user, as described hereinafter, for example using a touchscreen of the display 114 or the mouse 103. In enabling-disabling step 706, the electronic document is enabled by the processor 105, and the candidate image layer is disabled by the processor 105. The non-selected candidate images are thereby at least partly hidden so that the obfuscation of the electronic document is reduced. The selected image is then arranged in the electronic document. In image-placing step 707, the selected image is placed by the processor 105 into an image placeholder. The image placeholder may be highlighted when the selected image for placement is moved over the image placeholder.

In image-selecting decision step 708, a check is made by the processor to determine if another image is to be selected. If the image-selecting decision step 708 returns true (YES), processing continues at candidate-image-layer-displaying step 703. Otherwise, the image-selecting decision step 708 returns false (NO), processing terminates ("Finish"). The method 700 is described in greater detail hereinafter.

Figure 8:
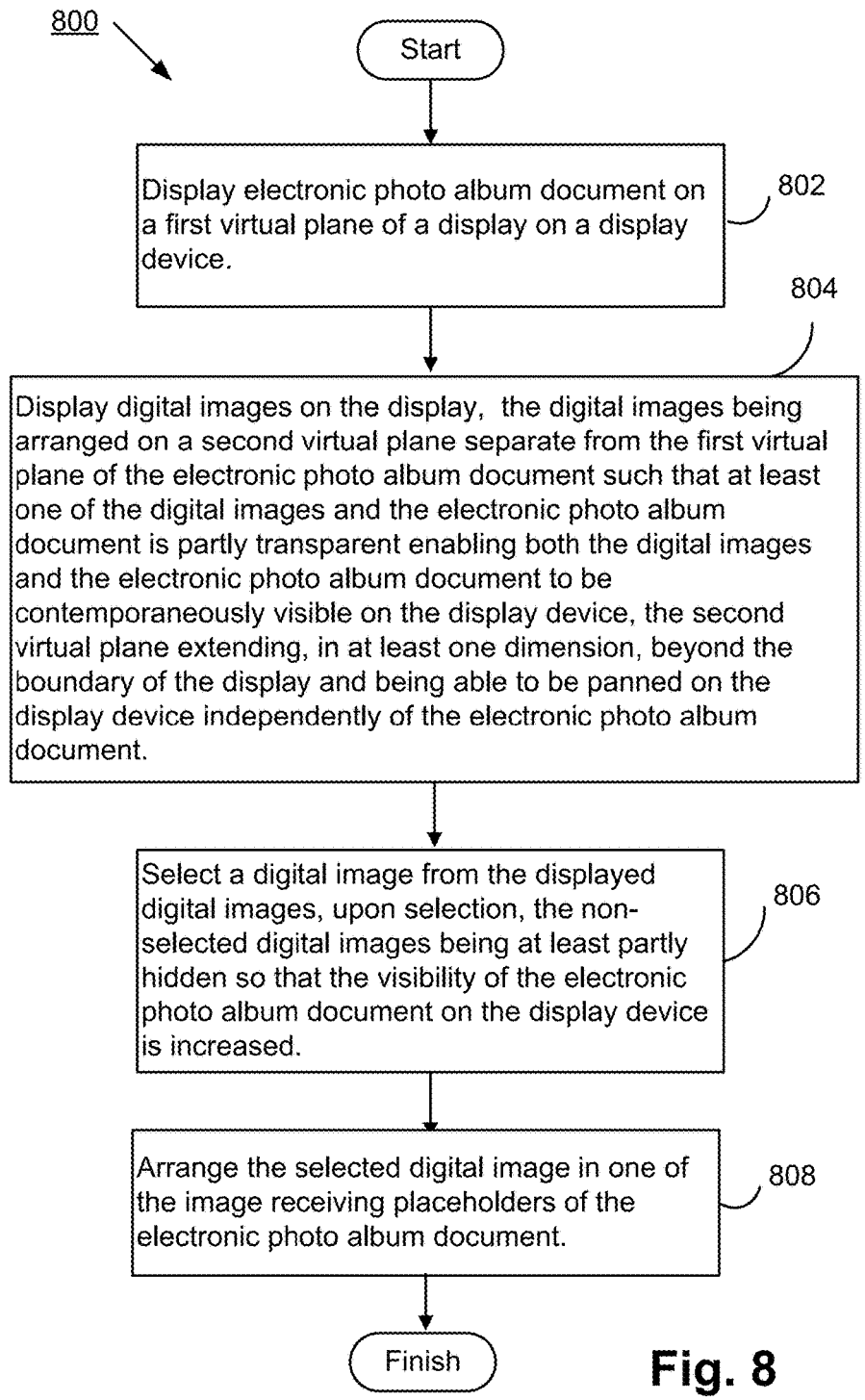
FIG. 8 is a schematic flow diagram illustrating a method of arranging a digital image in one of a plurality of image receiving placeholders of an electronic photo album document.

FIG. 8 illustrates a method 800 of arranging a digital image in one of several image receiving placeholders of an electronic photo album document. Processing commences in step 802. In step 802, the electronic photo album document is displayed on a first virtual plane of a display on a display device. In step 804, digital images are displayed on the display. The digital images are arranged on a second virtual plane separate from the first virtual plane of the electronic photo album document such that at least one of the digital images and the electronic photo album document is partly transparent, enabling both the digital images and the electronic photo album document to be contemporaneously visible on the display device. The second virtual plane extends, in at least one dimension, beyond the boundary of the display and is able to be panned on the display device independently of the electronic photo album document. In step 806, a digital image is selected from the displayed digital images; upon selection, the non-selected digital images are at least partly hidden, so that the visibility of the electronic photo album document on the display device is increased. In step 808, the selected digital image is arranged in one of the image receiving placeholders of the electronic photo album document.

The method 800 may further comprise restoring the non-selected digital images onto the display from at least partly hidden state of the non-selected digital images.

The image may be arranged in the electronic photo album document by placing the selected image into an image placeholder. The method 800 may further comprise highlighting the image placeholder when the selected image is moved over the image placeholder. The images arranged on the virtual plane may be grouped together on the virtual plane by a characteristic of the images. The characteristic of the images may be the date each candidate image was created, or a geographical characteristic of each image. The images arranged on the virtual plane may be grouped together on the virtual plane by a characteristic of the electronic photo album document. The characteristic of the electronic photo album document may be the size of the document, or the theme of the document. The virtual plane may be panned to locate an image in the images over an available placeholder in the electronic document arranges the image in the placeholder until the virtual plane is further panned, removing the image from the placeholder. The electronic photo album document may be further obfuscated as the virtual plane is panned. After step 808, the method 800 ends.

Figure 2:
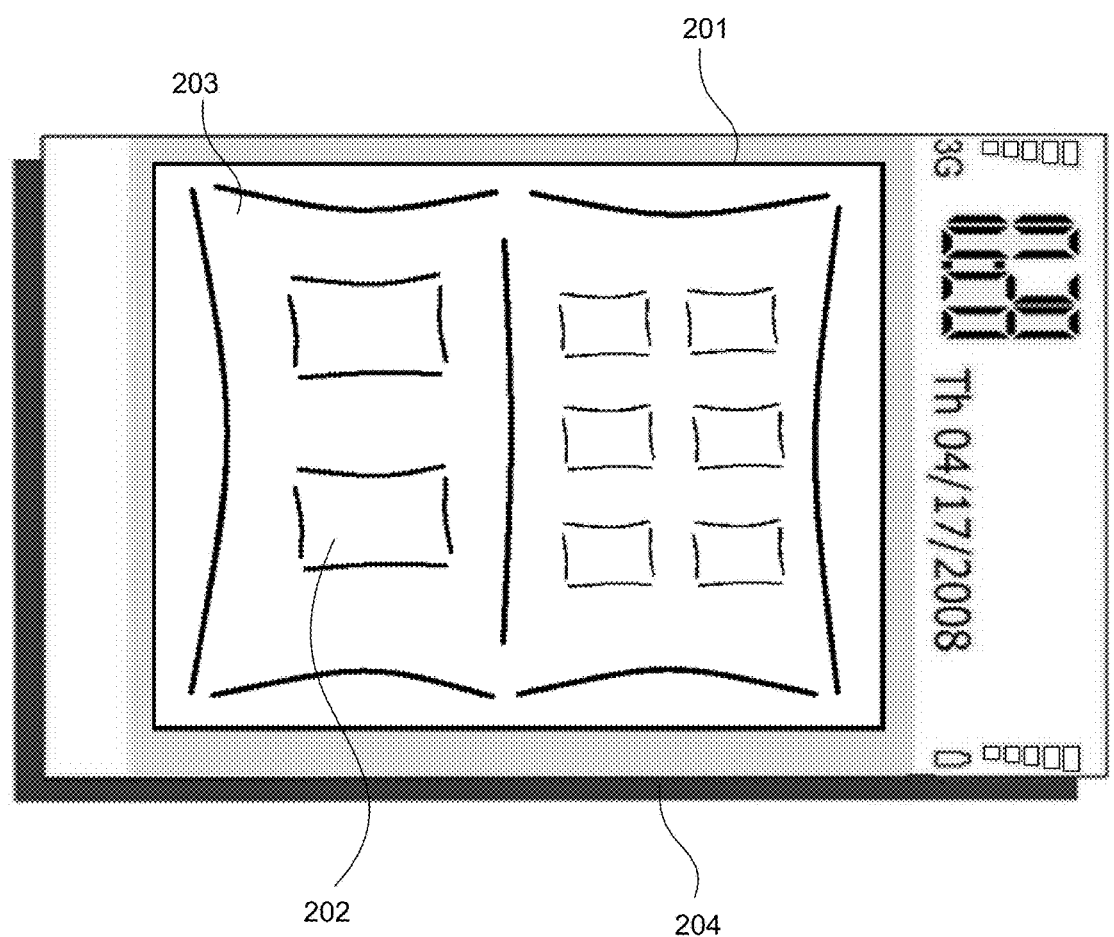
FIG. 2 is a schematic block diagram illustrating a photo album according to one embodiment of the invention.

The embodiments of the invention are generally directed to an implementation of an electronic document displayed on the display screen 201 of a small-screen electronic device 204, as shown in FIG. 2. The electronic document may represent a photo album 203, for example. However, the electronic document may represent posters, brochures, books, journals, magazines etc.

The photo album 203 is displayed 702 on the screen 201 as fully opaque, and additionally, the size (dimensions) of the photo album 203 is set so that the photo album 203 is displayed using as much screen (display) space as possible. The photo album 203 is populated with empty image placeholders 202. These image placeholders 202 are capable of holding a reference to an image.

Figure 3:
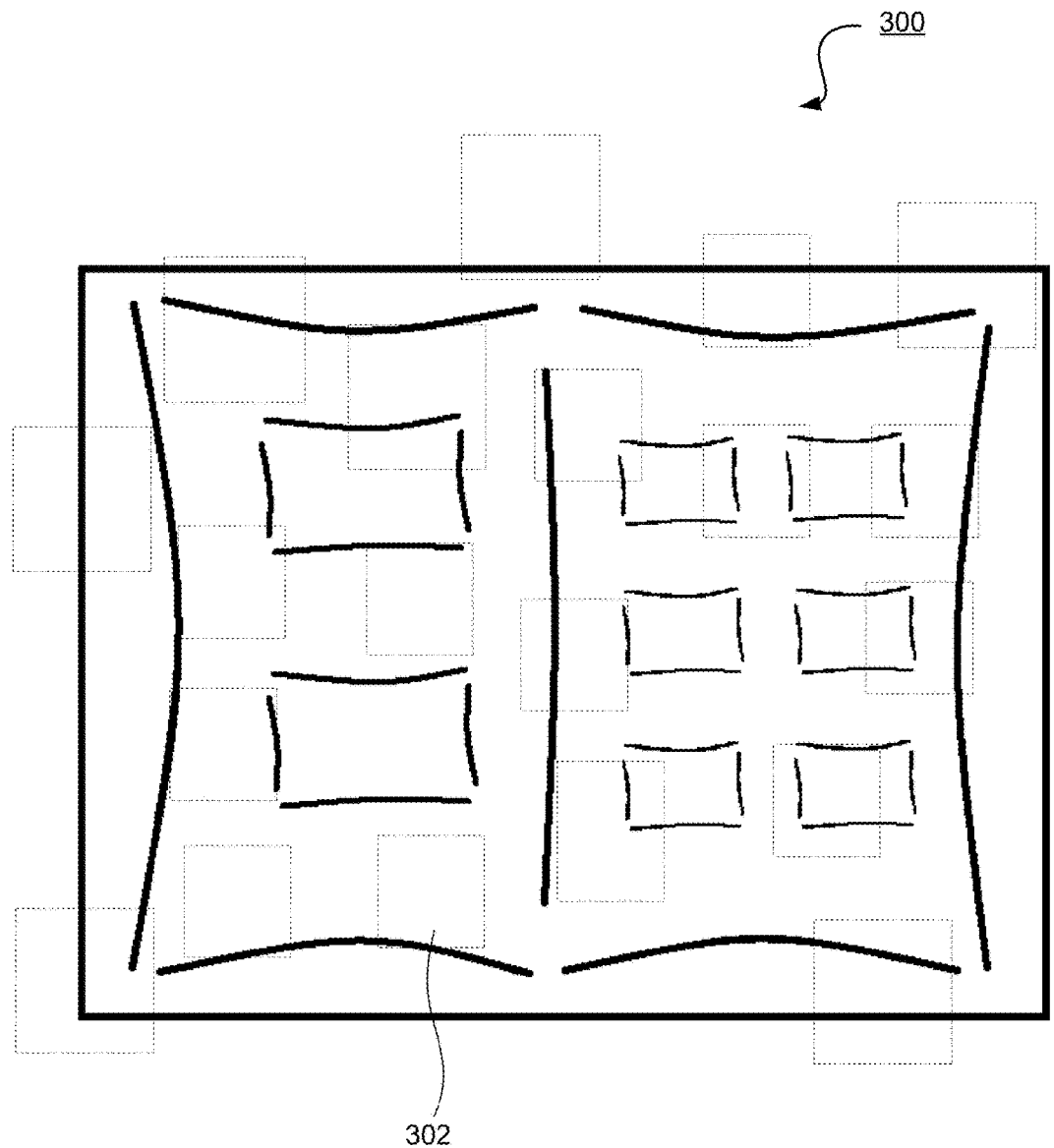
FIG. 3 is a schematic block diagram illustrating a candidate image layer.

The problem solved by the embodiments of the invention is how to populate the photo album 203 (and its image placeholders 202) with images 302 in FIG. 3. Introducing an "image panel" is not a desirable solution, because this reduces the size of the photo album, thereby reducing readability of the photo album 203, and reducing useability. Rather, in embodiments of the present invention, the images 302 are arranged 704 on top of the photo album 203 on a virtual plane, i.e. the candidate image layer. The features of the candidate image layer 300 of FIG. 3 are that the candidate image layer 300 of can extend much further than the visible screen 201 space to an almost infinite size (for example, the candidate image layer 300 of FIG. 3 may be approximately four times the size of the visible screen 201 due to performance and useability constraints). The advantages of having the candidate image layer 300 larger than the photo album 203 is that all the images 302 can be arranged on the image layer, and yet retain full perspective of the photo album 203 without losing screen 201 space with a section devoted to the images 302. Another advantage of this method is that the photo album 203 can be displayed at the photo album's maximum size, irrespective of the fact that the candidate image layer 300 exists. This is in contrast to existing techniques, where a photo album has to reduce its dimensions to allow the images to exist on the same screen space. This has the effect of reducing the useability and readability of the photo album.

The candidate image layer 300 in FIG. 3 is larger than the photo album 203, and therefore the candidate image layer 300 can be larger than the visible screen 201 space. The candidate image layer 300 can be panned in all directions, so that the layer moves over the photo album 203, the candidate image layer 300 appears to "float" above the photo album 203. The photo album 203 remains fixed to the same position on the visible screen 201 space. The panning feature of the candidate image layer 300 allows all the images 302 on the layer to be moved onto the visible screen 201 space. In the preferred embodiment, a finger or any other suitable pointing device would be used to "drag" the candidate image layer 300 in a direction so that the images 302 move across the photo album 203, however there are many gesture motions that could be used to achieve the drag operation. While dragging the candidate image layer 300 over the photo album 203, some images 302 are moved off the visible screen 201, while other previously invisible images 302 are moved into the view. The candidate image layer 300 acts as an independent layer to the photo album 203, so that the candidate image layer 300 can be panned (and zoomed) independent of the photo album 203 displayed on the screen 201. In the preferred embodiment, while the candidate image layer 300 is panned the transparency of candidate images is reduced with the effect that the images are clearer and photo album 203 is less visible. The level of visibility of the candidate images depends on the speed of panning with a higher speed resulting in more visibility of the candidate images.

The images 302 are arranged 704 on the candidate image layer 300 using one of many known methods. In one embodiment, the images 302 are arranged 704 on the candidate image layer 300 by grouping the images 302 based on characteristics of the image, such as the date the image was taken, and some geographical characteristics. This allows related images 302 to exist next to each other on the candidate image layer 300 and improves useability and reduces the amount of time taken to select a desired image. Many algorithms can be used to determine the arrangement of the images 302 on the candidate image layer 300. For example, the images 302 may be arranged 704 by taking into consideration the properties of the photo album 203 (with the most useful images 302 displayed in the center of the candidate image layer 300. Alternatively, the images 302 may be arranged by taking into consideration the dimensions of the image placeholders 202 on the photo album 203, or the images 302 may be filtered out depending on the theme of the photo album 203, or the images 302 may be grouped based on the identity of the person who took the photo. The images 302 may be scattered based on any common scattering algorithm. The images 302 may be arranged in a structured manner or randomly.

In one embodiment, the images 302 on the candidate image layer 300 are displayed semi-transparently, so that the photo album 203 underneath the layer 300 is only partially obscured and the photo album 203 can be seen underneath the candidate image layer 300. The level of opacity may be set to 50%; however any appropriate transparency level can be used. While in some embodiments the images 302 on the candidate image layer 300 may be opaque, this limits the visibility of the photo album 203 to only being visible between the images 302 on the candidate image layer 300.

The images 302 arranged 704 on the candidate image layer 300 can be lower resolution (thumbnail) representations of the source image. However the images 302 can be any size, because the size of the candidate image layer 300 is potentially infinite. In some cases, it is possible, and even useful, not to reduce the resolution of the images 302 on the candidate image layer 300, so that their true dimensions are not lost (thereby gaining a better perspective of the image before the image is placed into the photo album 203).

Next, an image in the candidate image layer 300 is selected 705 for insertion into the photo album 203. The image can be selected 705 by a user 601 via a finger gesture by pressing down on the desired image via a touchscreen display. In alternate embodiments, a mouse 103 click may be used, or pressing down with a finger for a relatively long time (three seconds). Any suitable gesture method may be used to select 705 the image.

In one embodiment, once an image is selected 705 the image becomes fully opaque and/or highlighted 402 by, for example, displaying a distinct border around the image. In yet another embodiment, the selected image may not become fully opaque, but may still be distinct from the non-selected images by having an opacity greater than the non-selected images. This can be achieved by either increasing the opacity of the selected image or reducing the opacity of the non-selected images. In one embodiment, all the non-selected images 302 on the candidate image layer 300 may become almost fully transparent 302 (for example, 10% opacity), and appear to be almost invisible. In an alternate embodiment, the images 302 that are not selected may become fully transparent, so that those images do not appear on the visible screen 201.

In yet another embodiment, the images 302 that are not selected do not lose their opacity, but the images are moved "out of the way" from the selected image, so that the moved images appear closer to the borders of the visible screen 201 space. Any suitable animation, movement or change of characteristic of the non selected images 302 that reduces the obfuscation of the photo album 203 can be implemented.

Additionally, selection of an image enables interaction 706 with the photo album 203. Therefore, the candidate image layer 300 is disabled 706, and any panning movement with the image responds to a potential action on the photo album 203. Selection of the image may also affect the opacity of the photo album 203. For example, in a case where the photo album 203 is semi-transparent while the candidate image layer 300 is active, selection of an image may activate and increase the opacity of the photo album 203 so as to indicate that the photo album 203 cannot be interacted with.

Figure 4:
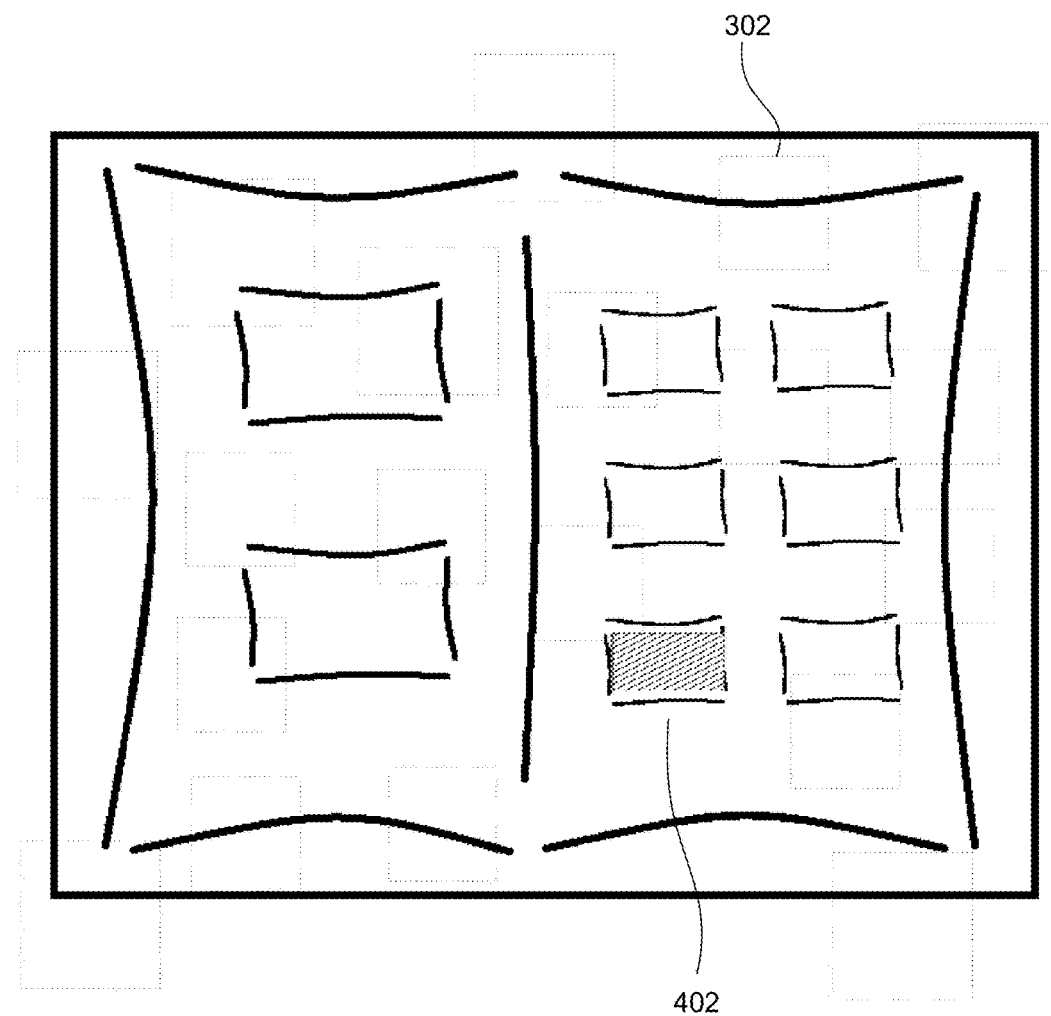
FIG. 4 is a schematic block diagram illustrating a selected image that has moved from the candidate image layer to the photo album.

As the selected image is dragged to an empty image placeholder, the empty image place holder may be highlighted as a result of the position of the selected image, and the selected image may "snap" into the image placeholder 707. This is illustrated in FIG. 4, where the selected image 402 has moved from the candidate image layer to the photo album. If the image is dragged further, past the image placeholder, the image "snaps" out of the image placeholder and resumes the normal drag path. In alternate embodiments, no such snapping action is necessary. In yet another embodiment, the selected image may be inserted into an empty place holder by simply selecting the desired placeholder.

While the image is dragged into the desired image placeholder 707 (on the photo album 203) all the other images in the candidate image layer 300 appear to be frozen, since this layer is disabled while the placeholder for the image is determined. Furthermore, the selected image is now removed from the candidate image layer 300, so that the selected image does not appear on that layer anymore.

Figure 5:
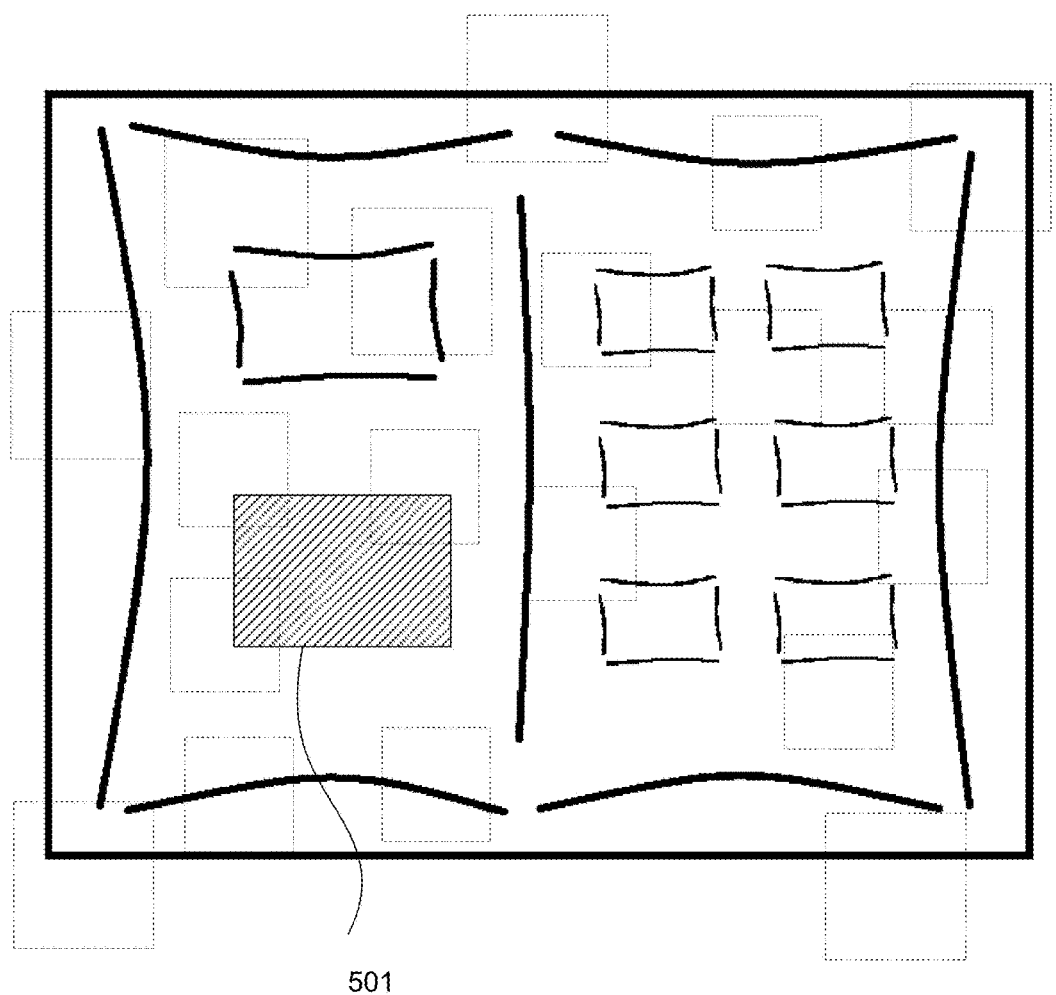
FIG. 5 is a schematic block diagram illustrating a photo album with an image and the re-enabled candidate image layer.

When the image is placed into an image placeholder 501 in FIG. 5, the dimensions of the image may be modified to make the image fit the image placeholder. The image may be cropped, resized, re-oriented, and bitmap effects may be applied to the image 501. The image 501 is now part of the photo album 203. The photo album 203 is now active, and the page index of the photo album 203 may be changed, so that the page turning animation reveals another page, possibly with empty image placeholders 202.

Once the selected image is inserted, the selected image is deselected and the candidate image layer 300 is re-enabled 708, and the opacity properties of all images on the candidate image layer 300 are restored to the original values. The photo album 203 becomes disabled again, and the interaction with the candidate image layer 300 resumes as previously described. In alternate embodiments, a gesture may be required to enable 707 the candidate image layer 300, for example, a selection from a menu, or by selecting some empty space outside of the borders 707 of the photo album 203.

In alternate embodiments, the image that was previously removed from the candidate image layer 300 and placed into the photo album 203 may reappear in the candidate image layer 300, so that the image can be placed into another empty image placeholder if desired. Furthermore, alternate embodiments may re-arrange the positioning of the images on the candidate image layer 300 to better reflect the changes in the photo album 203, since the photo album 203 has changed its characteristics (by having a new image placed into one of the image placeholders 202). This rearrangement can be based on the theme of the photo album 203, or on some characteristic of the image which was previously inserted into the photo album 203, such as the date the image was taken, or the geographical property of the image itself.

INDUSTRIAL APPLICABILITY

The arrangements described are applicable to the computer and data processing industries and particularly for digital photo albums.

Methods, apparatuses, and computer program products for arranging an image in an electronic document using a display have been described. More particularly, methods, apparatuses, and computer readable storage mediums for arranging a digital image in one of a plurality of image receiving placeholders of an electronic photo album document have been described. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of displaying digital images using an image display device, the method comprising the steps of:
displaying a plurality of digital images on the display device;
dragging, across an electronic document on the display device, a digital image from the plurality of displayed digital images in response to a user's designation;
making the plurality of displayed digital images partly transparent except for the dragged digital image while the digital image is dragged;
changing a display position of the dragged digital image according to a user operation; and
changing opacity properties of each of the plurality of displayed digital images other than the dragged digital image so that an opacity property of each of the plurality of displayed digital images other than the dragged digital image is restored to an opacity property possessed before the dragging commenced, the changing being performed once the dragging of the digital image across the electronic document is completed.

2. The method according to claim 1, further comprising the steps of:
displaying the electronic document on a first virtual plane of a display on the display device, wherein the plurality of digital images are displayed and arranged on a second virtual plane separate from, and overlaying, the first virtual plane of the electronic document.

3. The method according to claim 2, wherein the partial transparency enables both the plurality of digital images and the electronic document to be contemporaneously visible.

4. The method according to claim 2, wherein the second virtual plane extends, in at least one dimension, beyond a boundary of the display and is able to be panned on the display device independently of the electronic document.

5. The method according to claim 4, further comprising a step of restoring the digital images of the plurality of displayed digital images other than the dragged digital image onto the display from at least a partly hidden state.

6. The method as claimed in claim 4, further comprising a step of performing a placing operation for the dragged digital image so that the dragged digital image is arranged in the electronic document.

7. The method as claimed in claim 4, further comprising a step of partly highlighting the electronic document when the dragged digital image is moved over the electronic document.

8. The method as claimed in claim 4, wherein the plurality of digital images arranged on the second virtual plane are grouped together on the second virtual plane by a characteristic of the digital images.

9. The method as claimed in claim 8, wherein the characteristic of the plurality of digital images is the creation date of each candidate image, or a geographical characteristic of each digital image.

10. The method as claimed in claim 4, wherein the plurality of digital images arranged on the second virtual plane are grouped together on the second virtual plane by a characteristic of the electronic document.

11. The method as claimed in claim 10, wherein the characteristic of the electronic document is the size of the electronic document, or the theme of the electronic document.

12. The method as claimed in claim 4, wherein panning the second virtual plane to locate a digital image in the plurality of digital images over the electronic document arranges the digital image until the second virtual plane is further panned, removing the digital image from the electronic document.

13. The method as claimed in claim 2, wherein the electronic document is further obfuscated as the second virtual plane is panned.

14. A display control apparatus comprising:
a memory configured to store data and a computer program; and
a processor unit coupled to the memory and configured to execute a computer program, the memory and the processor being configured to arrange digital images in an electronic photo album document using a display of a display device, the computer program comprising:
code instructing the display of a plurality of the digital images on the display device;
code instructing the dragging, across the electronic document on the display device, a digital image from the plurality of displayed digital images in response to a user's designation;
code instructing the making of the plurality of displayed digital images partly transparent except for the dragged digital image while the digital image is dragged;
code instructing the changing of a display position of the dragged digital image according to a user operation; and
code instructing the changing of opacity properties of each of the plurality of displayed digital images other than the dragged digital image so that an opacity property of each of the plurality of displayed digital images other than the dragged digital image, is restored to an opacity property possessed before the dragging commenced, the changing being performed once the dragging of the digital image across the electronic document is completed.

15. The apparatus according to claim 14, further comprising:
code instructing the display of the electronic document on a first virtual plane of the display on the display device and arranging the plurality of digital images on a second virtual plane separate from, and overlaying, the first virtual plane of the electronic document.

16. The apparatus according to claim 15, wherein the electronic document is partly transparent.

17. The apparatus according to claim 14, wherein the partial transparency enables both the plurality of digital images and the electronic document to be contemporaneously visible.

18. The apparatus according to claim 16, wherein the second virtual plane extends, in at least one dimension, beyond the boundary of the display and is able to be panned on the display device independently of the electronic document.

19. The apparatus according to claim 18, further comprising:
code instructing the restoring of the digital images of the plurality of displayed digital images other than the dragged digital image onto the display from at least a partly hidden state.

20. The apparatus as claimed in claim 18, wherein the dragged digital image is arranged in the electronic document by performing a placing operation of the dragged digital image.

21. The apparatus as claimed in claim 18, further comprising:
code instructing the partial highlighting of the electronic document when the dragged digital image is moved over the electronic document.

22. The apparatus as claimed in claim 18, wherein the plurality of digital images arranged on the second virtual plane are grouped together on the second virtual plane by a characteristic of the digital images.

23. The apparatus as claimed in claim 22, wherein the characteristic of the plurality of digital images is the creation date of each candidate image, or a geographical characteristic of each digital image.

24. The apparatus as claimed in claim 18, wherein the plurality of digital images arranged on the second virtual plane are grouped together on the second virtual plane by a characteristic of the electronic document.

25. The apparatus as claimed in claim 24, wherein the characteristic of the electronic document is the size of the electronic document, or the theme of the electronic document.

26. The apparatus as claimed in claim 18, wherein panning the second virtual plane to locate a digital image in the plurality of digital images over the electronic document arranges the digital image until the second virtual plane is further panned, removing the digital image from the electronic document.

27. The apparatus as claimed in claim 15, wherein the electronic document is further obfuscated as the second virtual plane is panned.

28. A non-transitory computer-readable storage medium having recorded therein a computer executable program for directing a computer processor to perform a method of displaying digital images using an image display device, the method comprising the steps of:

> displaying a plurality of digital images on the display device;
>
> dragging, across an electronic document on the display device, a digital image from the plurality of displayed digital images in response to a user's designation;
>
> making the plurality of displayed digital images partly transparent except for the dragged digital image while the digital image is being dragged;
>
> changing a display position of the dragged digital image according to a user operation; and
>
> changing opacity properties of each of the plurality of displayed digital images other than the dragged digital image so that an opacity property of each of the plurality of displayed digital images other than the dragged digital image, is restored to an opacity property possessed before the dragging commenced, the changing being performed once the dragging of the digital image across the electronic document is completed.

* * * * *